April 6, 1926.
H. G. BEYER
PARKING LAMP
Filed Sept. 17, 1924
1,579,855
2 Sheets-Sheet 1
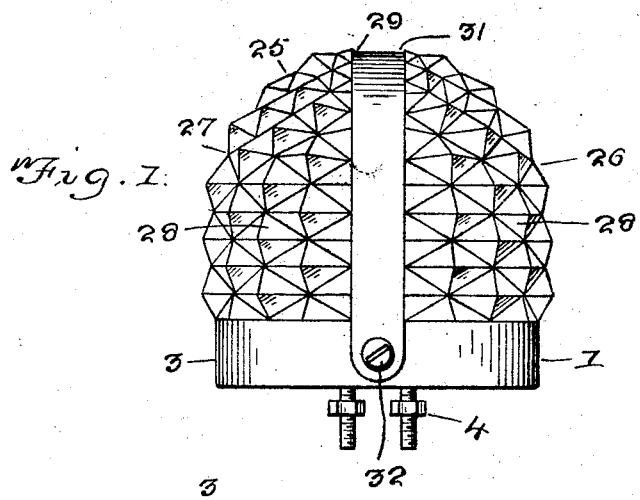
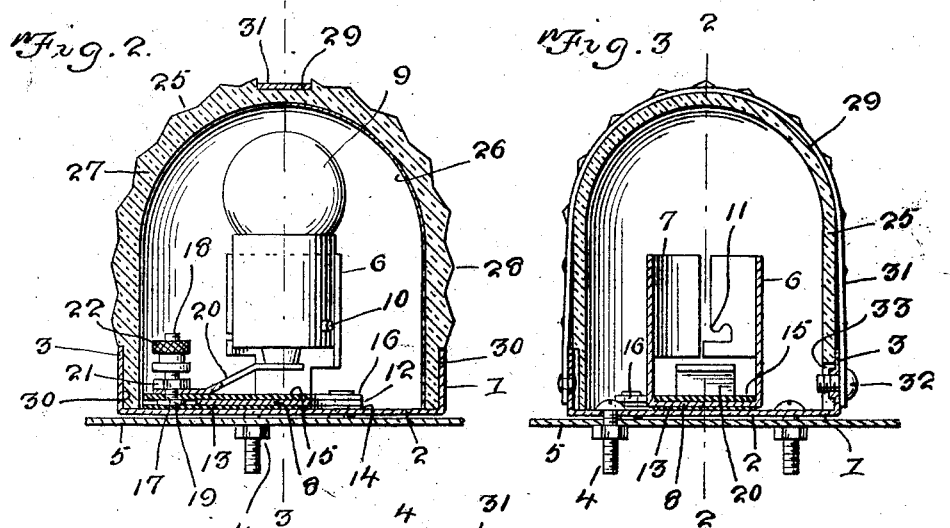
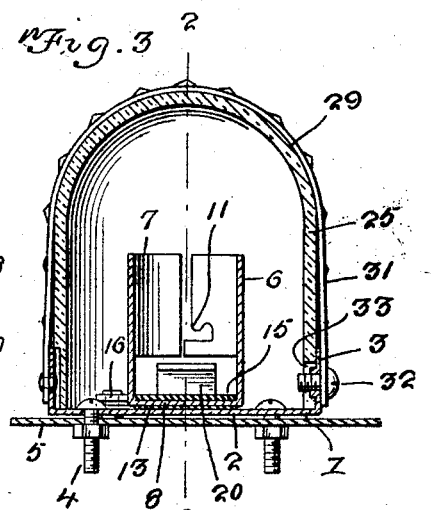
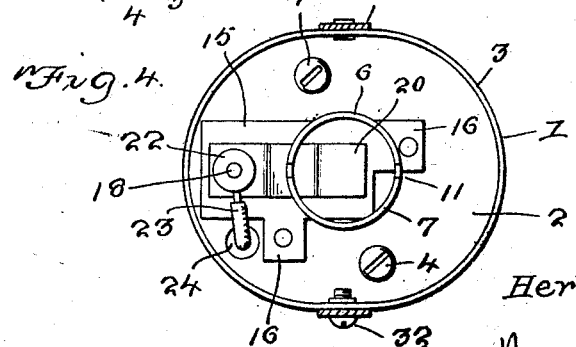
Inventor
Herbert G. Beyer
By Spear, Middleton, Donaldson & Hall
Attorney April 6, 1926.  1,579,855
H. G. BEYER
PARKING LAMP
Filed Sept. 17, 1924   2 Sheets-Sheet 2
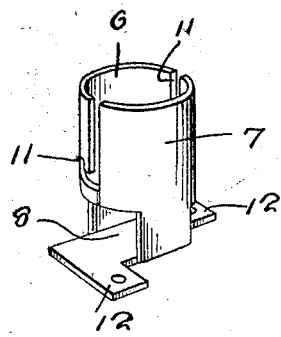
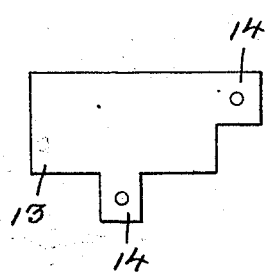
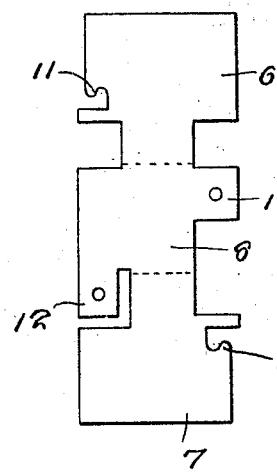
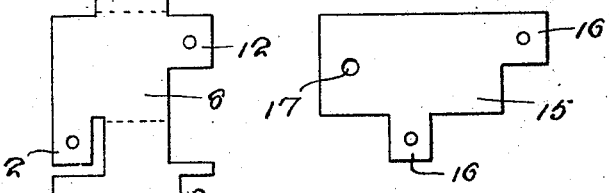
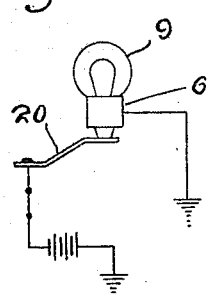
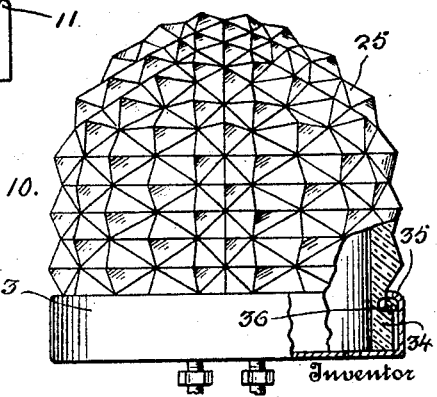
Inventor
Herbert G. Beyer
Attorney Patented Apr. 6, 1926.

1,579,855

UNITED STATES PATENT OFFICE.

HERBERT G. BEYER, OF BALTIMORE, MARYLAND, ASSIGNOR TO RAE-LITE MANUFACTURING CO., OF BALTIMORE, MARYLAND, A CORPORATION OF MARYLAND.

PARKING LAMP.

Application filed September 17, 1924. Serial No. 738,280.

*To all whom it may concern:*

Be it known that I, HERBERT G. BEYER, a citizen of the United States, and resident of Baltimore, in the city of Baltimore and State of Maryland, have invented certain new and useful Improvements in Parking Lamps, of which the following is a specification.

My present invention relates to a parking or signal lamp, and more particularly to such a device as used upon motor vehicles, although obviously, the invention is equally adaptable as running lights for marine vessels or airplanes.

The principal object of the invention is the provision of means which will show a clear light forward of the vehicle, and a red light to the rear, as this is required in many States when a vehicle such as an automobile is parked upon a street unattended after dark.

Another important object of the invention is the provision of a parking or signal light of the type described which will be very compact, simple and cheap to construct, and which may be easily attached by one not particularly skilled in the art.

I have found a particular adaptation of the invention to reside in certain instrumentalities particularly adapted for electricity, that is, where the illuminating element is an electric light bulb, although it will be very obvious that any well known illuminating means might replace the electric light bulb shown, and the invention is, therefore, not limited to the electrical adaptation.

To this end my invention includes a base member which is adapted to be secured to any supporting means such as the fender of an automobile or the deck of a boat, and upon this base the illuminating means is mounted. Upon the base is placed a shell or housing for the illuminating means, preferably composed entirely of glass, and this housing may be secured to the base in any approved fashion. In order to assist in retaining the casing to the base, I may provide a flexible band secured to the base and passing over the top of the casing, as illustrated. Where an all glass casing is used, it will be found desirable to color one half thereof with a color, say red, leaving the other half clear or uncolored so that when the illuminating means is lighted, a ruby or red color will be transmitted through the colored portion and a white light through the uncolored portion, meeting the requirement for a parking light, as above mentioned.

I have illustrated in the accompanying drawings, several modifications of the invention which are to illustrate merely the principle involved, and I do not wish to be limited to the structure disclosed.

In these drawings:—

Figure 1 is a side elevation of one embodiment of my invention.

Fig. 2 is a sectional longitudinal view along the line 2—2 of Fig. 3.

Fig. 3 is a lateral sectional view along the line 3—3 of Fig. 2.

Fig. 4 is a plan view of the device of Fig. 1, with the glass casing removed.

Fig. 5 is a perspective view of the socket element.

Fig. 6 is a plan view of one of the insulation strips.

Fig. 7 is a development of the socket member.

Fig. 8 is a plan view of one of the insulation strips.

Fig. 9 is a diagrammatic view of the electrical circuit, including the device of this application.

Fig. 10 is a side elevation, partly in section, of a modified form of my invention.

Referring now with particularity to the embodiment of the invention illustrated, I have shown a base 1 composed of a bottom part 2 having upstanding walls 3, the whole structure taking somewhat the form of a saucer. This base 1 is adapted to be secured to a suitable supporting surface, such as an automobile fender, as by means of the bolts 4 passing through the bottom 2 and the fender, illustrated at 5.

One satisfactory form of socket for an electric light bulb may be made by stamping or otherwise cutting from stock, a sheet of material having wings 6 and 7 joined by a center portion 8. It will be noted that the wings 6 and 7 extend on each side of the main center or connecting portion 8 so that when the parts 6 and 7 are curled inwardly toward the longitudinal center of the strip and bent upward at right angles to the part 8, they form a substantially circular socket within which an electric light bulb 9 may be securely held, the pins 10 on the socket engaging the bayonet slots 11 in the socket element. It will also be noted that attached to the connecting portion 8, ears 12 are provided, the function of which will be described hereinafter. In assembling the socket onto the base portion, I have found it desirable to place a sheet of insulation 13 of substantially the configuration illustrated, which is provided with ears 14, this sheet of insulation being adapted to underlie the said formation. The socket is made so that the ears 12 on the socket and the ears 14 on the insulation piece coincide. On top of this socket element I place a second sheet of fibre 15, having ears 16 coinciding with the ears on the socket and the insulation sheet so that a rivet may be passed through aligning apertures in the three sets of ears and the bottom 2 of the base, thus securing the socket to the base. The fibre piece 15 is provided with an aperture 17 in an extension thereof, to which is fitted a screw 18 having a head 19 which is prevented from making contact with the bottom 2 by reason of the interposition of a corresponding extension on the insulation piece 13. Over the screw 18 and on top of the fibre piece 15 I place a spring contact 20 extending within the socket proper, which is adapted to make contact with the bottom contact of the electric light bulb 9. The contact 20 is secured in place by means of nut 21 and a knurled nut 22 is also threaded to the screw 18 to receive a wire 23 of the electrical circuit through an aperture 24 in the bottom 2. It will thus be apparent that the socket is grounded on the base by means of the rivets passing through the ears 12 of the socket, but that the contact 20 is entirely insulated from said base. In this way an electrical circuit may be made, as diagrammatically illustrated. This circuit is adapted to be controlled by a switch placed in any convenient location, and as may be desired.

The casing which I have found it desirable to use with a light of this character is illustrated generally at 25 and comprises a shell of glass or other transparent material having a colored portion 26 and an uncolored portion 27. This coloring may be done in any desired way, either applied to the inner surface, or the outer surface, or both, as may be desirable. I have found that by faceting the exterior surface of the casing 25, as shown at 28, I am able to secure a much larger distribution of light than if the casing were smooth.

The casing 25 is supplied with a smooth or grooved portion 29 passing up one side and over the top thereof. There is likewise a smooth partially depressed portion 30 running around the bottom of the casing so that when the casing is placed within the dished base 1 the facets are substantially flush with the upstanding wall 3.

As one means of retaining the casing in the structure, I supply a resilient band 31 secured as by a rivet to one side of the wall 3 of the base, passing up one side of the casing, over the top and down the other side and lying in the groove 29, the opposite end of the band 31 being perforated to receive a screw 32 threaded to the wall 3 of the base. In this instance there is a cut-away portion 33 in the casing so that the screw 32 will not injure the same when it is threaded to the base. This cut-away portion serves also as a positioning means, as it will not be possible to mount the casing on the base in other than the correct way.

As illustrative of another method of securing the casing to the base, I may provide the bottom of the casing 25 with a flange, as at 34, the top of the upstanding wall 3 of the base having an inwardly projecting flange, as at 35. Between the two I might place a spring member 36. Such a structure is usual in the ordinary tail lights, and other electrical fixtures in use, and to which no claim is made.

It will now be seen that I have provided a novel light of the parking type, which is small and compact, and of very attractive appearance, the bulb or other lighting medium being used therein being entirely accessible by simply taking out the screw 32 and removing the casing 25. The band 31 covers any irregularities in the juncture of the colored and uncolored portions of the casing 25, and in addition to this use, gives an ornamental appearance to the structure.

Having thus described my invention, what I claim is:—

1. A parking lamp including a base having a flange at its periphery, a light holding means secured to said base, a glass casing housing said light holding means, means to secure said casing to said base including a loop of material passing over and hugging said casing and secured at each end to said flange.

2. A parking lamp including a base, a light holding means secured thereto, a glass casing housing said light holding means and having a substantially vertical side wall, a depressed vertical channel in said side wall, and retaining means for said casing lying in said channel and secured to the base.

3. A parking lamp including a base, a light holding means secured thereto, a glass casing housing said light holding means and having a substantially vertical side wall, a depressed vertical channel therein extending substantially the entire height of said side wall, and retaining means for said casing lying in said channel.

4. A parking lamp, including a base, a light holding means secured thereto, a glass dome-shaped casing housing said light holding means, and having a channel over the top and down the sides.

5. A parking lamp including a base, a light holding means secured thereto, a housing for said light holding means, comprising a glass shell having a light disseminating faceted surface, said surface being broken by an unfaceted strip passing over the top and down the sides thereof, and around the bottom.

6. A parking lamp including a base, a light holding means secured thereto, a housing for said light holding means comprising a dome-shaped glass casing having a channel over the top thereof, said channel being adapted to receive a casing holding means.

7. A parking lamp, including a base, a light holding means secured thereto, a housing for said light holding means comprising a dome-shaped glass casing having a vertical channel down the sides thereof, and adapted to receive a casing holding means.

In testimony whereof, I affix my signature.

HERBERT G. BEYER.